United States Patent
Jang et al.

(10) Patent No.: US 6,728,403 B1
(45) Date of Patent: Apr. 27, 2004

(54) METHOD FOR ANALYZING STRUCTURE OF A TREATISE TYPE OF DOCUMENT IMAGE

(75) Inventors: Dae-Geun Jang, Taegu (KR); Kyung-Ae Moon, Taejon (KR); Young-Sup Hwang, Taejon (KR); Su-Young Chi, Taejon (KR); Weon-Geun Oh, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/496,630

(22) Filed: Feb. 2, 2000

(30) Foreign Application Priority Data

Jan. 21, 2000 (KR) .......................................... 2000-2772

(51) Int. Cl.[7] .............................................. G06K 9/34
(52) U.S. Cl. ....................................... 382/180; 382/176
(58) Field of Search ................................ 382/173–180, 382/306; 715/513, 515; 707/104.1

(56) References Cited

U.S. PATENT DOCUMENTS

| | | | | |
|---|---|---|---|---|
| 4,907,285 A | * | 3/1990 | Nakano et al. | 382/176 |
| 5,073,953 A | * | 12/1991 | Westdijk | 382/176 |
| 5,185,813 A | * | 2/1993 | Tsujimoto | 382/180 |
| 5,335,290 A | * | 8/1994 | Cullen et al. | 382/176 |
| 5,379,373 A | * | 1/1995 | Hayashi et al. | 715/513 |
| 5,434,962 A | * | 7/1995 | Kyojima et al. | 715/513 |
| 5,555,362 A | * | 9/1996 | Yamashita et al. | 715/517 |
| 5,701,500 A | * | 12/1997 | Ikeo et al. | 715/517 |
| 5,848,186 A | * | 12/1998 | Wang et al. | 382/176 |
| 5,850,490 A | * | 12/1998 | Johnson | 382/306 |
| 5,999,664 A | * | 12/1999 | Mahoney et al. | 382/305 |
| 6,233,353 B1 | * | 5/2001 | Danisewicz | 382/176 |
| 6,598,046 B1 | * | 7/2003 | Goldberg et al. | 707/5 |

FOREIGN PATENT DOCUMENTS

| | | | | |
|---|---|---|---|---|
| JP | 11203285 | | 7/1999 | ........... G06F/17/27 |
| JP | 11203305 | | 7/1999 | ........... G06F/17/30 |
| KR | 97-17047 | | 8/1996 | ............. G06T/3/04 |

OTHER PUBLICATIONS

Lin, et al.; *Logical Structure Analysis of Book Document Images Using Contents Information*; Apr. 1997; pp. 1048–1054.

* cited by examiner

Primary Examiner—Jayanti K. Patel
Assistant Examiner—Aaron Carter
(74) Attorney, Agent, or Firm—Jacobson Holman PLLC (57) ABSTRACT

A method for analyzing structure of a treatise type of document image in order to detect a title, an author and an abstract region and recognize the content in each of the regions is provided. In order to analyze the structure of a treatise type of document, first, the document image divided into a number of regions and the divided regions are classified into text regions and non-text regions according to attributes of the regions. And then, the candidate regions representing an abstract and an introduction is selected, thereafter word regions are extracted from the candidate regions, and an abstract content portion is determined. Thereafter, the title and the author are separated by using the basic form and the type definition representing an arrangement of each of journals. Finally, the content of the separated regions is recognized to generate said table of contents.

11 Claims, 11 Drawing Sheets

METHOD FOR ANALYZING STRUCTURE OF A TREATISE TYPE OF DOCUMENT IMAGE

FIELD OF THE INVENTION

The present invention relates to a method for processing a document image; and, more particularly, to a method for analyzing structure of a treatise type of document image in order to detect a title, an author and an abstract region and recognize the content in each of the regions.

DESCRIPTION OF THE PRIOR ART

There are many techniques for processing a document image to construct a database system. One of techniques is a document image structure analysis(see, ChunChen Lin, "Logical Structure Analysis of Book Document Image using Contents Information", ICDAR 97, Vol. II, pp. 1048–1054, August, 1997). According to the document structure analysis, a character recognition process is performed on a table of contents of a book so that the entire logical structure of the book is analyzed. Since, however, in order to utilize this technique, there must be provided a table of the contents of book, therefore, it is impossible to construct a database system of treatise typed of document image.

In order to construct a database system providing a portion of or an entire of treatises contained at each of journal in a form of document image or a hypertext file format, a table of contents having a title, an author and an abstract information has to be generated.

Hitherto, the table of contents having a title, an author and an abstract information is made by a human being. One reason is that a multi-language recognition is very difficult. Generally, the title and the author are represented on two languages. Another reason is that each position of the title, the author and the abstract is different according to each of the journals. Thus, it is difficult to detect of the position thereof. The other reason is that there is not a distinct difference between the title and the author.

Therefore, it is required to automatically detect title, author and abstract regions and recognize the content in each of the regions so as to make a table of the contents of the treatise in the journals.

SUMMARY OF THE INVENTION

It is, therefore, a primary object of the invention to provide a method for automatically detecting title, author and abstract regions in document image and recognize the content in each of the regions so as to make a table of the contents of the treatise in the journals.

In accordance with the present invention, there is provided a method for analyzing a structure of a treatise type of document image to make a table of contents having a title, an author and an abstract information, comprising the steps of: dividing the document image into a number of regions and classifying the divided regions into text regions and non-text regions according to attributes of the regions; selecting candidate regions representing an abstract and an introduction, extracting word regions from the candidate regions, and determining an abstract content portion; separating the title and the author using the basic form and the type definition representing an arrangement of each of journals; and recognizing the content of the separated regions to generate said table of contents.

In accordance with another aspect of the present invention, there is provided a computer readable media containing the program, the program having functions of: dividing the document image into a number of regions and classifying the divided regions into text regions and non-text regions according to attributes of the regions; selecting candidate regions representing an abstract and an introduction, and finding word regions from the candidate regions to determine the position of an abstract content portion; separating the title and the author using the basic form and the type definition representing an arrangement of each of journals; and recognizing the content of the separated regions to generate said table of contents.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
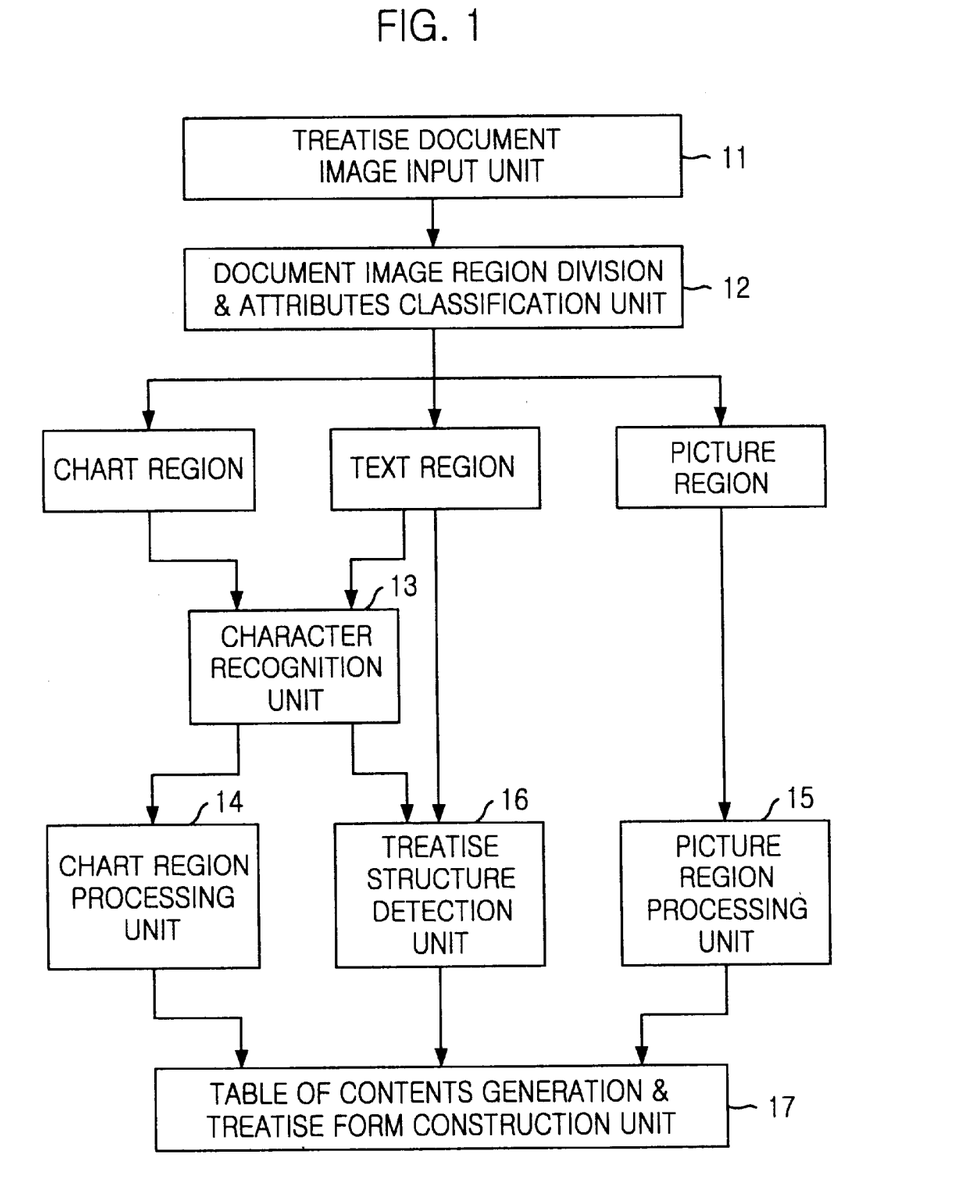
FIG. 1 is a block diagram of an auto tagging system of a treatise type of document image.

Referring to FIG. 1, there is shown a block diagram of an auto tagging system of treatise typed of document image in accordance with the present invention.

The auto tagging system recognizes a text, a picture, and a chart from an inputted document image. And then the auto tagging system determines the structure of the inputted document image to automatically generate an HTML(Hyper Text Markup Language) file.

As shown in FIG. 1, a treatise type of document image (300~400 dpi of TIFF image) is inputted to a treatise document image input unit 11. In a document image division and attribute classification unit 12, the inputted image provided from the treatise document image input unit 11 is divided by using a region expansion and merging technique which connects connected components, and also, the attributes of each of the regions is classified based on a black pixel density and the average and the deviation of region spaces. The attributes are text, picture and chart.

And then, the characters contained at the text or chart regions are recognized at a character recognition unit 13.

A chart region processing unit 14 recognizes the line of the chart and the characters contained at the chart.

On the other hand, in a picture region processing unit 15, a picture portion is converted to GIF format which is used at the HTML file.

And, a treatise structure detection unit 16 finds the title of a treatise, the author and abstract, and analyzes the structure of the treatise to generate a table of the contents of the treatise. The output from the treatise structure detection unit 16 is used at the HTML file.

A table contents generation and treatise form construction unit 17 utilizes the above described outputs to make the table of contents and to convert the inputted image into the HTML files.

Hereinafter, the process of detecting the position of the abstract, title and author; recognizing the characters corresponding to the abstract, title and author, and generating the table of the contents is described. Since the other process described in FIG. 1 is common technique, a detailed description is omitted.

The inventive process includes five processes as follows:

[1] first process for selecting candidate regions;

[2] second process for detecting distinct word regions;

[3] third process for determining abstract content portions;

[4] fourth process for separating the title and the author; and

[5] fifth process for recognition the characters.

In a first process, a set of candidate regions is selected. If distinct words representing 'abstract' and 'introduction' are searched at the candidate regions, the searching time can be reduced. In order to select the candidate regions, an average length of text regions is calculated by using Eq. (1) as follows:

$$Ave\_L_x = \frac{\sum_{cond(Attr(R_i)=TEXT)} L_x(R_i)}{n(R_i, cond(Attr(R_i) = TEXT))}$$

In Eq. (1), $Lx(R_i)$ is a horizontal length of ?th region, $Attr(R_i)$ is an attribute of ith region, and $n(R_i, cond(Attr(R_i)=TEXT))$ is the number of text regions.

After calculating the average length of the text regions, the regions each of which has the length being smaller than 8 times of the average length is determined to the candidate regions. This is programmed as follows:

```
repeat loop(repeat number = region number)
{
    if(Lx(Ri)<8(Ave_Lx)
    choose Ri as Candidate Region
}
```

Second, a distinct word region is detected. By using the character recognition unit 13, a distinct word region such like [YOYAK] ([??]) ('YOYAK(??)' means the abstract in Korean language), [Abstract], [Summary], [SEORON] ([??]) ('SEORON([??])' means the introduction in Korean language), [Introduction] is detected according to following probability standards: in case that the region corresponding to [YOYAK] or [SEORON] is detected, the detection probability must be 100%; when the region corresponding to [Abstract] or [Summary] is detected, the detection probability must be over 80%; and if the region corresponding to the distinct word [Introduction] is detected, the detection probability must be over 70%.

Figure 2A:
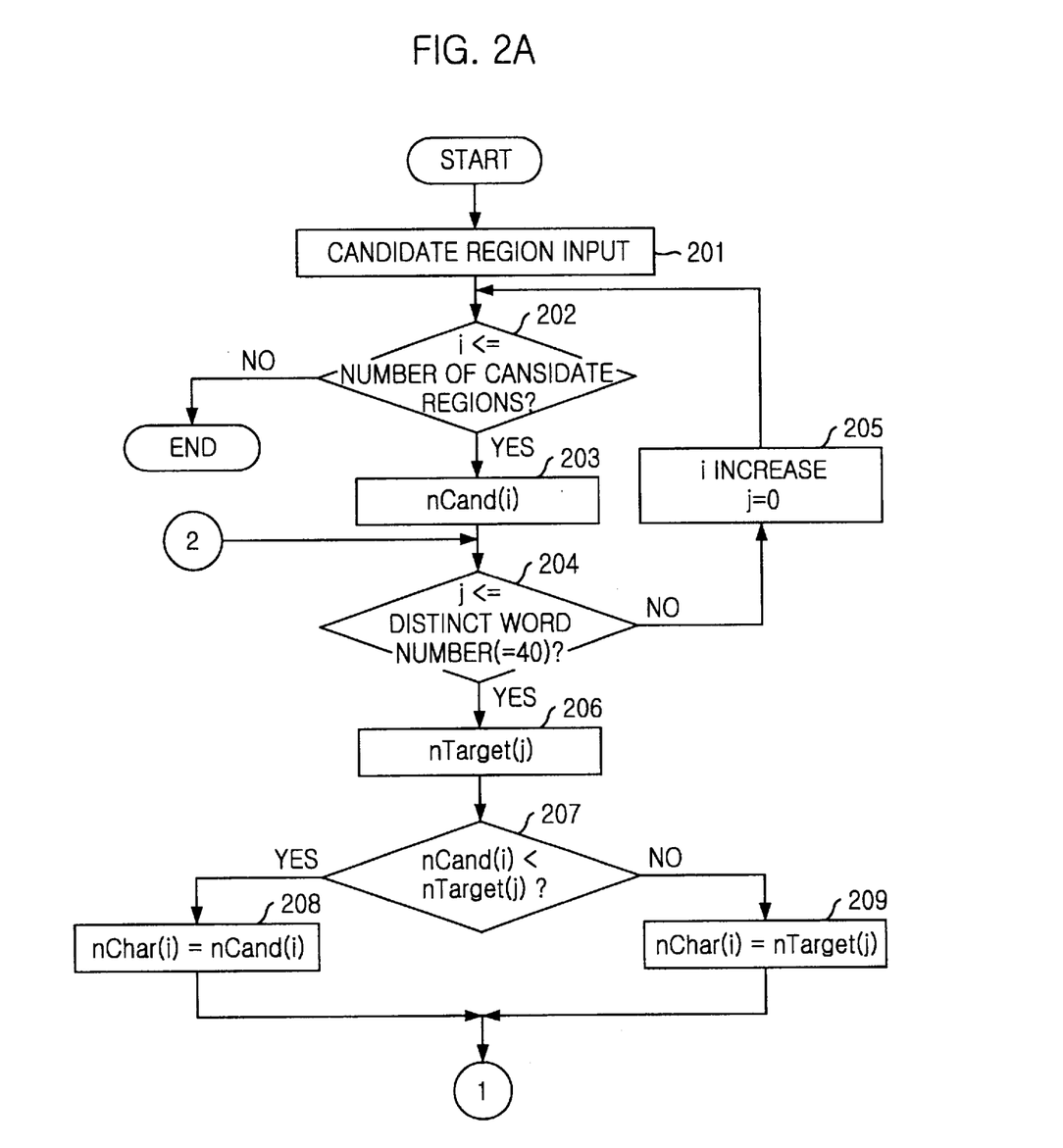
FIGS. 2A and 2B show exemplary flowcharts for extracting a word region in a process of analyzing structure of treatise typed of document image in accordance with the present invention.
Figure 2B:
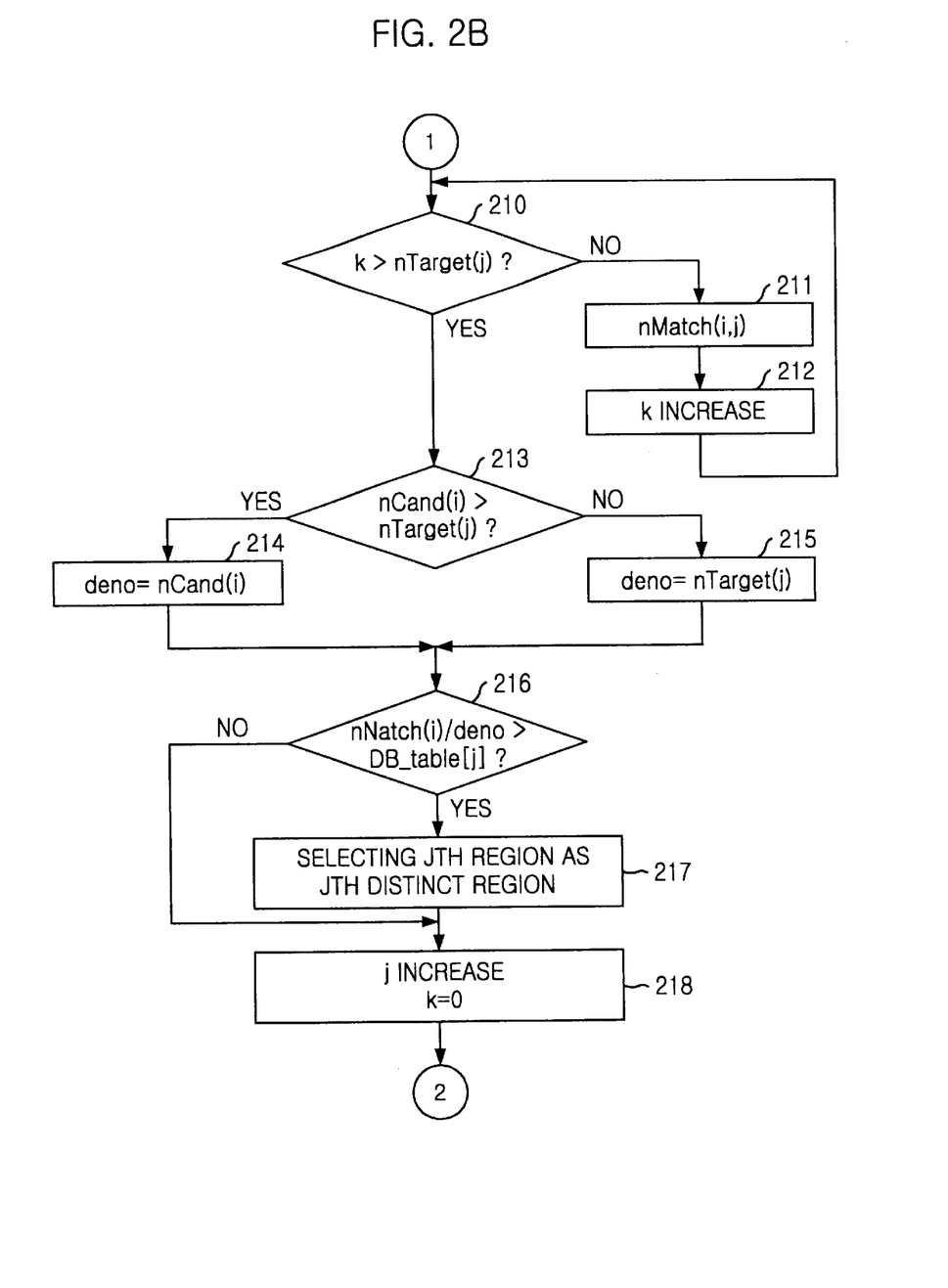

After detecting the distinct word region, the distinct word region is extracted. This process is described with reference to FIGS. 2A and 2B. FIGS. 2A and 2B show exemplary flowcharts for extracting a word region within a process of analyzing structure of treatise typed of document image.

As shown in FIGS. 2A and 2B, in step 201, a candidate region is inputted. In case that the candidate region is inputted, in step 202, the number of the candidate regions is checked. And then, in step 203, the number of characters in the candidate region is obtained.

Thereafter, in steps 204 to 211, each of the characters in the candidate region is compared to each of the characters in the distinct word to determine how many characters are coincided.

And then, in steps 213 to 215, the ratio of a numerator to a denominator is calculated. The denominator is the bigger one between the number of characters of each of the candidate regions and the number of characters of each of the predetermined words. The numerator is the number of the coincided characters. After calculating the ratio, in steps 216 and 217, if the calculated ratio is larger than the predetermined determination probability, the candidate region is determined to be the word region.

The process of detecting the distinct word region is programmed as follows:

```
{nCand(i) _ the number of characters of ith candidate region
    repeat loop(repeat until distinct word number(40), loop counter:j)
        {nTarget(j) _ the number of characters of jth distict word
            nChar(i) : the number of charatcters comparing the ith candidate region to jth distict word
            if(nCand(i) < n Target(j))
                nChar(i) = nCand(i)
            else
                nChar(i) = nTarget(j)
            repeat loop(repeat until nChar(i), loop counter:k)
        {nMatch(i,j) _ the number of characters corresponding the position of ith candidate region and jth distinct word to a code vale}
            deno: a denominator value for comparing the similarity between ith candidate region and jth distinct word
            if(nCand(i) > nTarget(j))
                deno = nCand(i)
            else
                deno = nTarget(j)
            if(nMatch(i)/deno > DB table[j] (_ determination
```

-continued probability of jth distinct word among 40 number of distinct words
and each of determination probability)
```
        }
    }
}
```

Wherein, a distinct word and DB_Table[ ] are shown at Table I.

TABLE I

| Distinct        |     | Distinct word   |     |
|-----------------|-----|-----------------|-----|
| YOYARK(?)       | 1.0 | 1SEORON(??)     | 1.0 |
| YO(?)           | 1.0 | SEORON(??)      | 1.0 |
| YARK(?)         | 1.0 | I.SEORON(??)    | 1.0 |
| Abstract        | 0.8 | ISEORON(??)     | 1.0 |
| ABSTRACT        | 0.8 | 1.Introduction  | 0.7 |
| Abstract        | 0.8 | 1.INTRODUCTION  | 0.7 |
| Summary         | 0.8 | 1.introduction  | 0.7 |
| SUMMARY         | 0.8 | 1Introduction   | 0.7 |
| Summary         | 0.8 | 1INTRODUCTION   | 0.7 |
| 1.SEORON(       | 1.0 | 1introduction   | 0.7 |
| I.Introduction  | 0.7 | CHAM(?)         | 1.0 |
| I.INTRODU       | 0.7 | GO(?)           | 1.0 |
| I.introduction  | 0.7 | MOON(?)         | 1.0 |
| Iintroduction   | 0.7 | HEON(?)         | 1.0 |
| IINTRODU        | 0.7 | References      | 0.8 |
| Iintroduction   | 0.7 | REFERENCES      | 0.8 |
| Introduction    | 0.7 | References      | 0.8 |
| INTRODUC        | 0.7 | Reference       | 0.8 |
| Introduction    | 0.7 | REFERENCE       | 0.8 |
| CHAMGOM         | 0.8 | Reference       | 0.8 |

In third process, the abstract content portion is determined.

The region between the distinct word [YOYAK], [Abstract], [Summary] and another distinct word [SEORON], [Introduction] detected at the first process, is the portion of the abstract content. The abstract content portion is classified with five types. The abstract content portion is detected according to above described second process.

First type is in case that two predetermined words representing 'abstract' and 'introduction' are existed and the abstract content portion is positioned at one column. The process for searching the abstract content portion in the first type is described with reference to FIG. 3.

Figure 3:
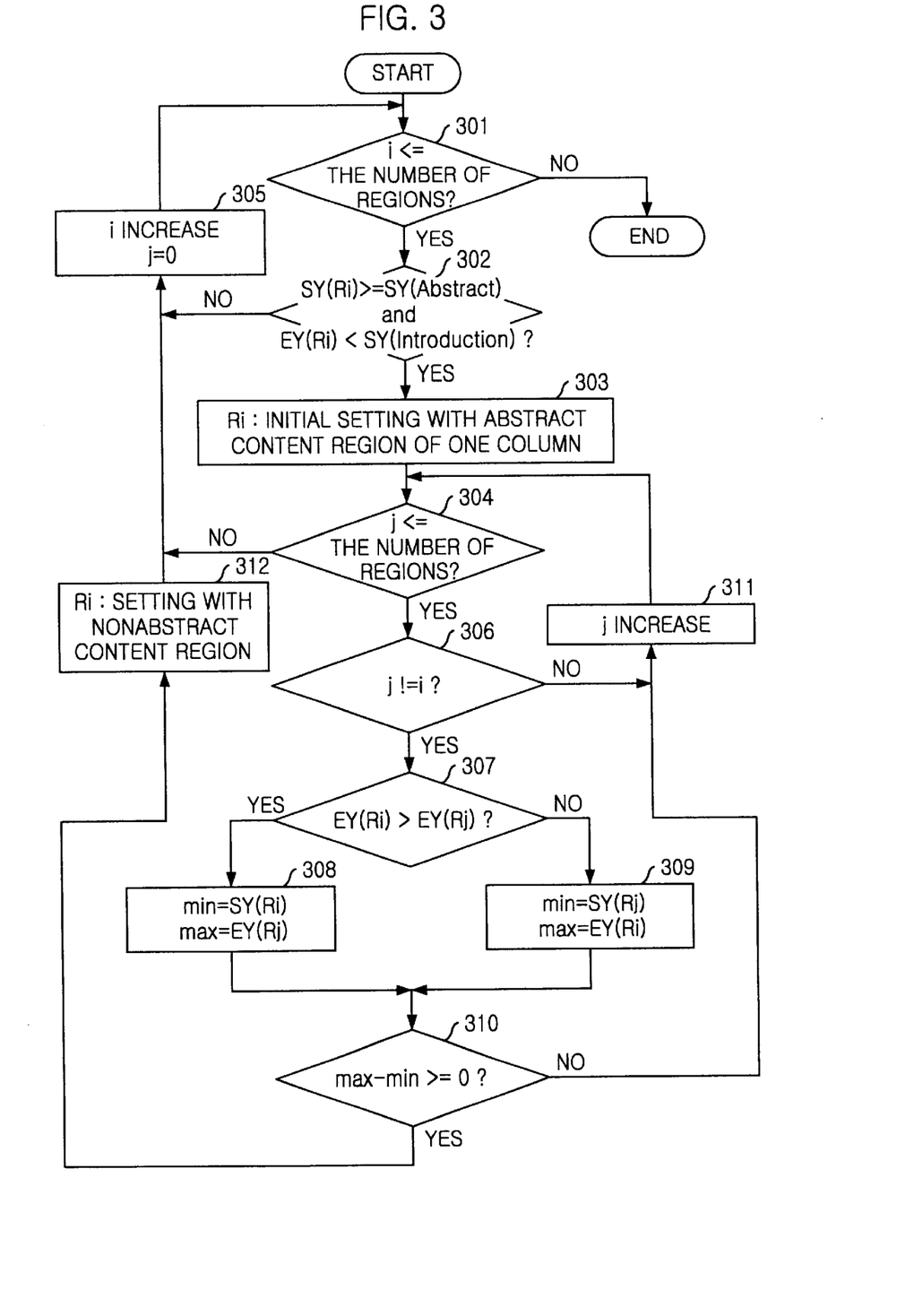
FIG. 3 describes an exemplary flowchart of determining an abstract content portion in case that two predetermined words representing 'abstract' and 'introduction' exist and the abstract content portion is positioned at one column.

As shown in FIG. 3, in steps 301 to 303, in case that two words representing the abstract and the introduction exist and the abstract content portion is made by one column in the document image, a region of which vertical direction start coordinate is equal to or larger than that of a predetermined region corresponding to the abstract region and is smaller than that of a predetermined region corresponding to the introduction region is selected.

And then, in steps 307 to 309, a minimum value(min) and a maximum value(max). In case that the vertical direction last coordinate of the elected region is larger than that of the comparing region, the minimum value is replaced with the vertical region start coordinate of the selected region and the maximum value is replaced with the vertical direction last coordinate of the comparing region. On the other hand, in case that the vertical direction last coordinate of the elected region is less than that of the comparing region, the maximum value is replaced with the vertical region start coordinate of the selected region and the minimum value is replaced with the vertical direction last coordinate of the comparing region.

Thereafter, in steps 310 and 312, it is determined whether the selected region is the abstract content region or not by using both the maximum and the minimum values. For example, in case that 'max−min<0', the selected region is determined to the abstract content portion.

The above described process for searching the abstract content portion may be programmed as follows:

```
{
    if(SY(Ri) >= SY(YOYAK or Abstract or Summary)
        if(EY(Ri) < SY(SEORON or Introduction)
            {Ri is set to an initial region of abstract
    content         one column
            //it is determined whether region Ri is one column or not
            repeat loop(repeat until region number
            (j!=I, loop counter : j)
            {if(EY(Ri)>EY(Rj))
                        min=SY(Ri), max=EY(Rj)
                else
                        min=SY(Rj), max=EY(Ri)
                if(max−min >= 0)
                {Ri is set to be not the abstract
                        Content portion
                        Loop j exit
``` wherein,

SY($R_i$) is the start Y coordinate of ith region, and

SY(YOYAK or Abstract or Summary) is the start Y coordinate of region corresponding to the distinct word abstract.

Second type of the five types is in case that two predetermined words representing 'abstract' and 'introduction' are existed and the abstract content portion is positioned at a left column of two columns. The process for searching the abstract content portion in the second type is described with reference to FIG. 4.

Figure 4:
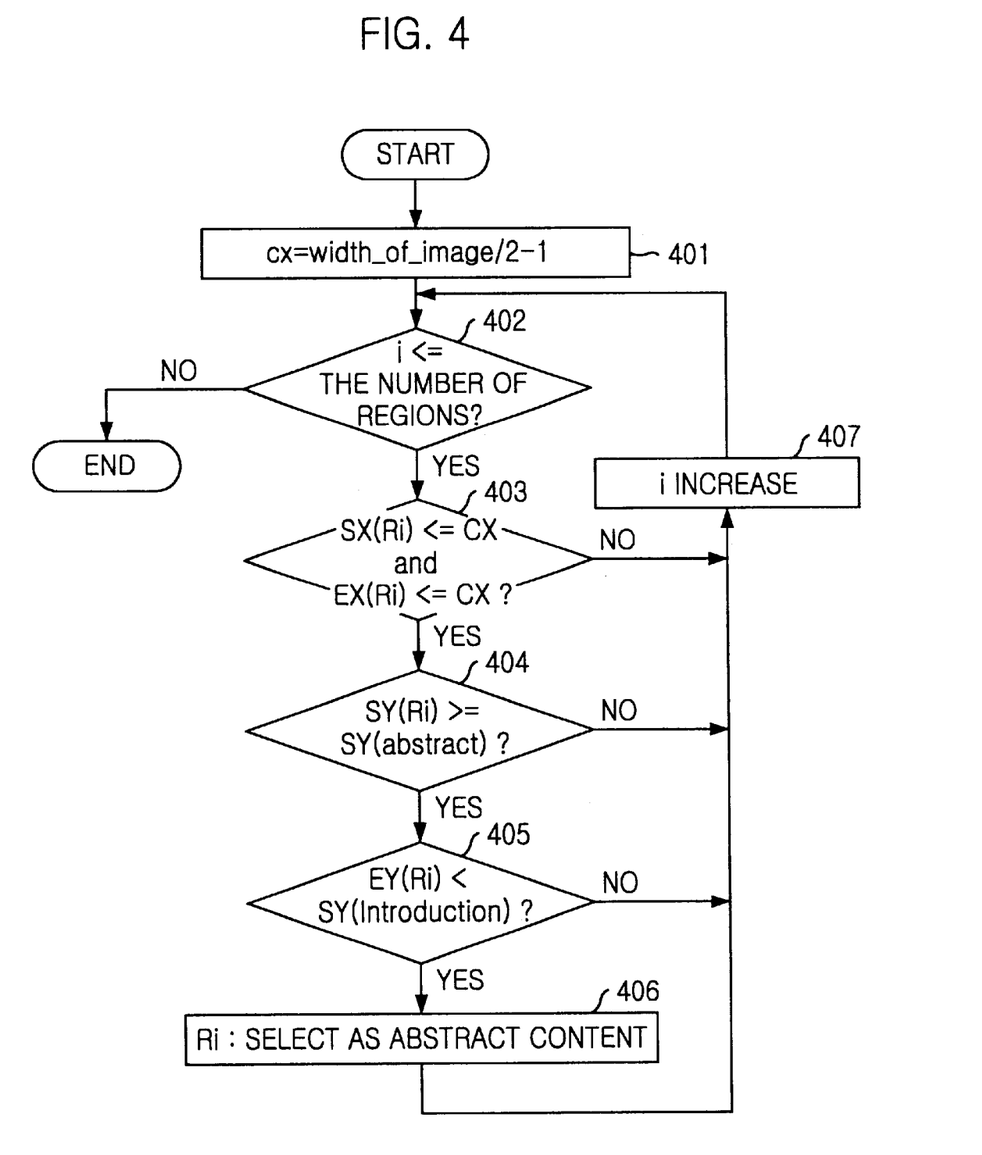
FIG. 4 depicts a flowchart of searching an abstract content portion in case that two predetermined words representing 'abstract' and 'introduction' exist and the abstract content portion is positioned at a left column of two columns.

As shown in FIG. 4, in step 403, in case that two words representing the abstract and the introduction exist and the abstract content portion is positioned at the left column of two columns in the document image, a region of which the horizontal direction last coordinate is located at the left of the center of the image document, is selected.

Thereafter, in step 404 to 406, there is selected a region, among the selected regions in step 403, of which the vertical direction start coordinate is equal or larger than that of a predetermined region corresponding to the abstract region and is smaller than that of another predetermined region corresponding to the introduction region.

The above described process for searching the abstract content portion may be programmed as follows:

```
CX = Width_of_Image/2 − 1: horizontal direction center
coordinate of document image
    Repeat loop(repeat until region number, loop counter : I)
    {in case that the region is positioned at the left column
        if(SX(Ri) <= CX and EX(Ri) <=CX)
            if(SY(Ri) >= SY(YOYAK or Abstract or Summary))
                if(EY(Ri) < SY(SEORON or Introduction))
                    Ri is selected as abstract content region}
```

Third type of the five types is in case that two predetermined words representing 'abstract' and 'introduction' are existed and the abstract content portion is positioned at both columns. The process for searching the abstract content portion in the third type is described with reference to FIG. 5.

Figure 5:
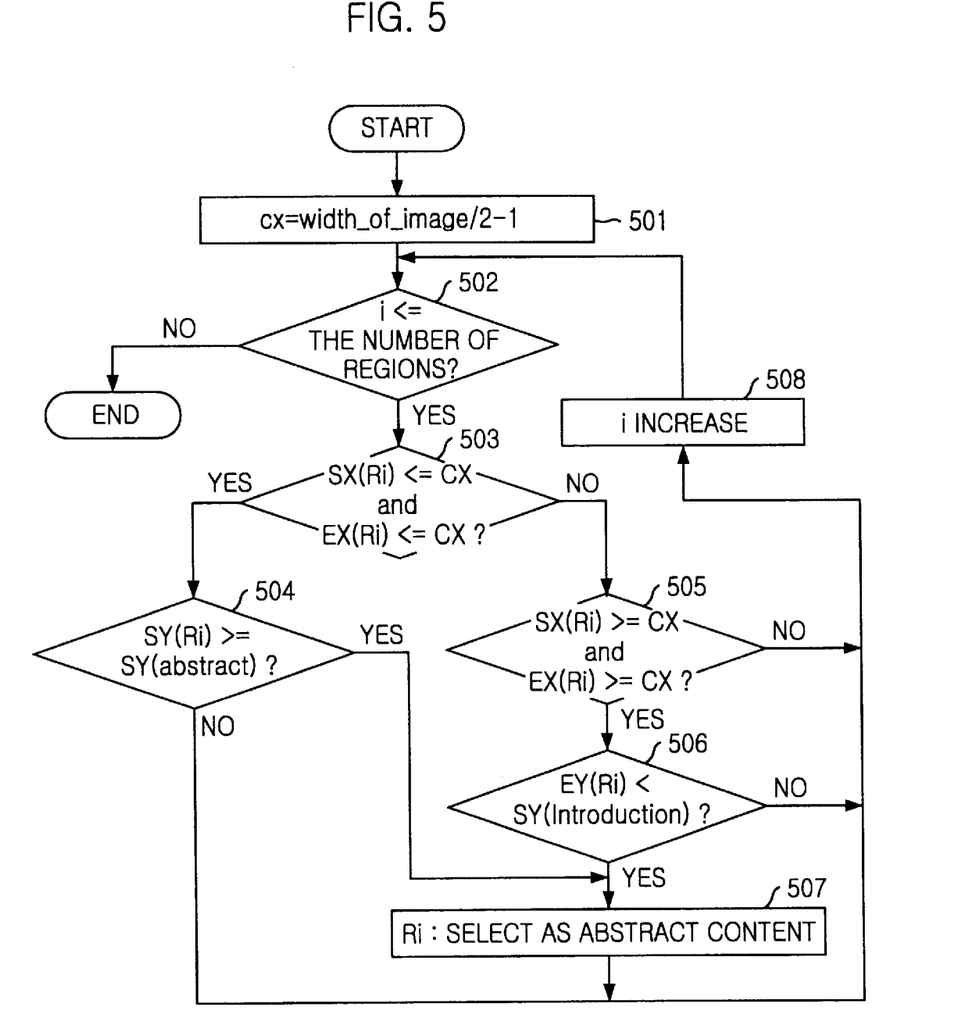
FIG. 5 is a flowchart of searching an abstract content portion in case that two predetermined words representing 'abstract' and 'introduction' exist and the abstract content portion is positioned at two columns.

As shown in FIG. 5, in steps 503 and 504, in case that two words representing the abstract and the introduction exist and the abstract content portion is positioned the left and the right columns in the document image, there is selected a region of which the horizontal direction last coordinate is located at the left of the center of the document image and the vertical direction start coordinate is equal to or larger than that of a predetermined region corresponding to the abstract region.

Thereafter, in steps 505 to 507, there is selected a region, among the selected regions in steps 503 and 504, of which the horizontal direction start coordinate is located at the right-hand of the center of the document image and the vertical direction last coordinate is smaller than that of the region corresponding to the introduction.

The above described process for searching the abstract content portion may be programmed as follows:

```
CX = Width_of_Image/2 - 1: horizontal direction center
coordinate of document image
    Repeat loop(repeat until region number, loop counter : I)
    {in case that the region is positioned at left column
        if(SX(Ri) <= CX and EX(Ri) <=CX)
            {if(SY(Ri) >= SY(YOYAK or Abstract or Summary))
                Ri is selected as abstract content region}
        in case that the region is positioned at right column
        else if(SX(Ri) >= CX and EX(Ri) >= CX)
            {
        if(EY(Ri) < SY(SEORON or Introduction))
                Ri is selected as abstract content region}
```

Fourth type of the five types is in case that the distinct word representing 'abstract' exists and the distinct word representing 'introduction' does not exist and the abstract content portion is positioned at one column. The process for searching the abstract content portion in the fourth type is described with reference to FIG. 6.

Figure 6:
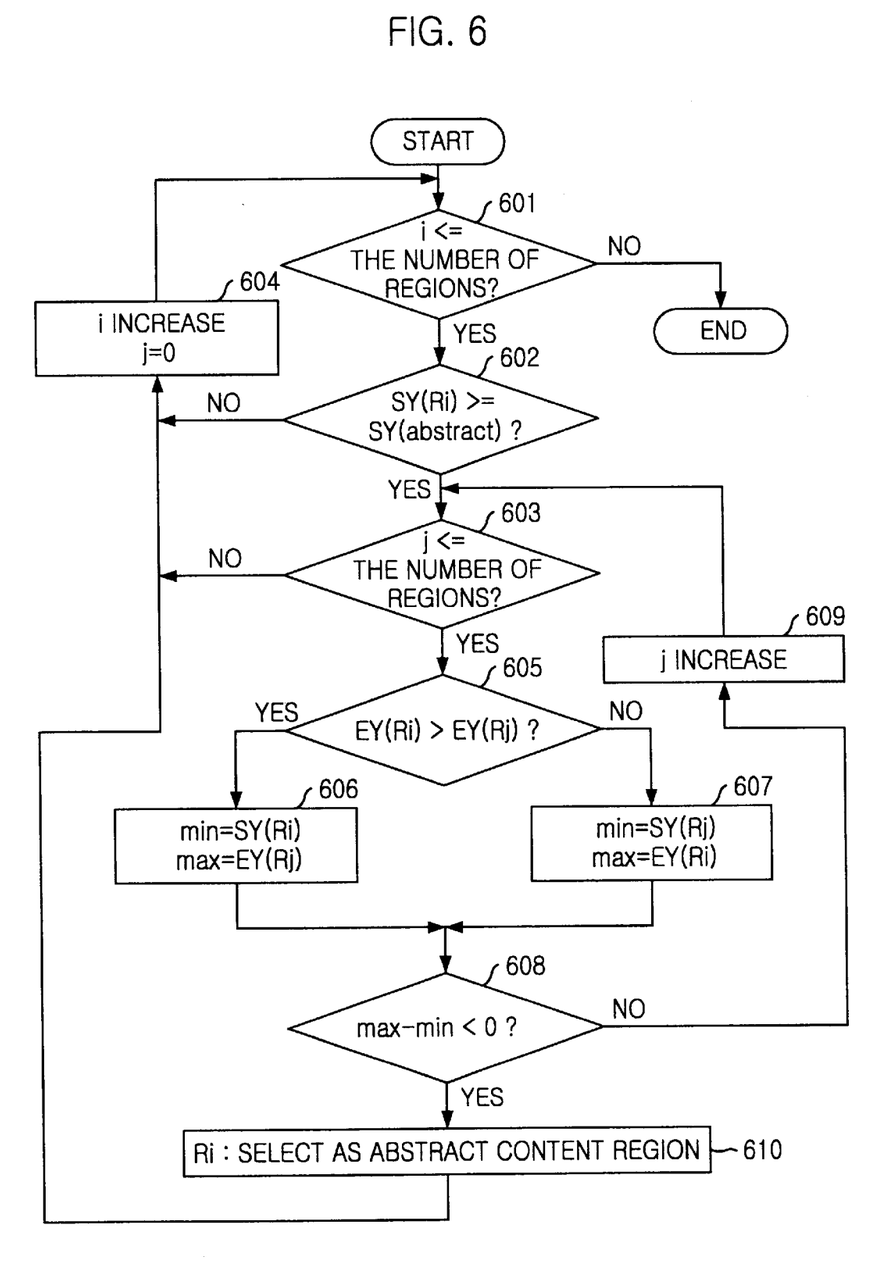
FIG. 6 describes a flowchart of searching an abstract content portion in case that a predetermined word representing 'abstract' exists and a predetermined word representing 'introduction' does not exist and the abstract content portion is positioned at one column.

As shown in FIG. 6, in steps 601 and 602, in case that the word representing the abstract exists and the word representing the introduction does not exist and the abstract content portion is made by one column in the document image, there is selected a region of which vertical direction start coordinate is equal to or larger than that of a predetermined region corresponding to the abstract region.

And then, in steps 603 to 607, a minimum value(min) and a maximum value(max) is obtained. In case that the vertical direction last coordinate of the selected region is larger than that of the comparing region, the minimum value is replaced with the vertical region start coordinate of the selected region and the maximum value is replaced with the vertical direction last coordinate of the comparing region. Otherwise, in case that the vertical direction last coordinate of the elected region is less than that of the comparing region, the maximum value is replaced with the vertical region start coordinate of the selected region and the minimum value is replaced with the vertical direction last coordinate of the comparing region.

Thereafter, in step 610, it is determined whether the selected region is the abstract content region or not by using both the maximum and the minimum values. For example, if 'max−min>=0', the selected region is determined the abstract content portion.

The above described process for searching the abstract content portion may be programmed as follows:

```
Repeat loop(repeat until region number, loop counter : I)
    {if(SY(Ri) >= SY(YOYAK or Abstract or Summary)
        it is determined whether region Ri is one column or not
```

-continued
```
        repeat loop(repeat until region number
            (excluding ith region, loop counter j)
        if(EY(Ri)>EY(Rj))
            min=SY(Ri), max=EY(Rj)
            else
            min=SY(Rj), max=EY(Ri)
        if(max−min >= 0)
        {Ri is set to the abstract
            Content portion
            Loop j exit}
```

The last of the five types is in case that the distinct words representing 'abstract' and 'introduction' do not exist and the abstract content portion is positioned at two columns. The process for searching the abstract content portion in the fifth type is described with reference to FIG. 7.

Figure 7:
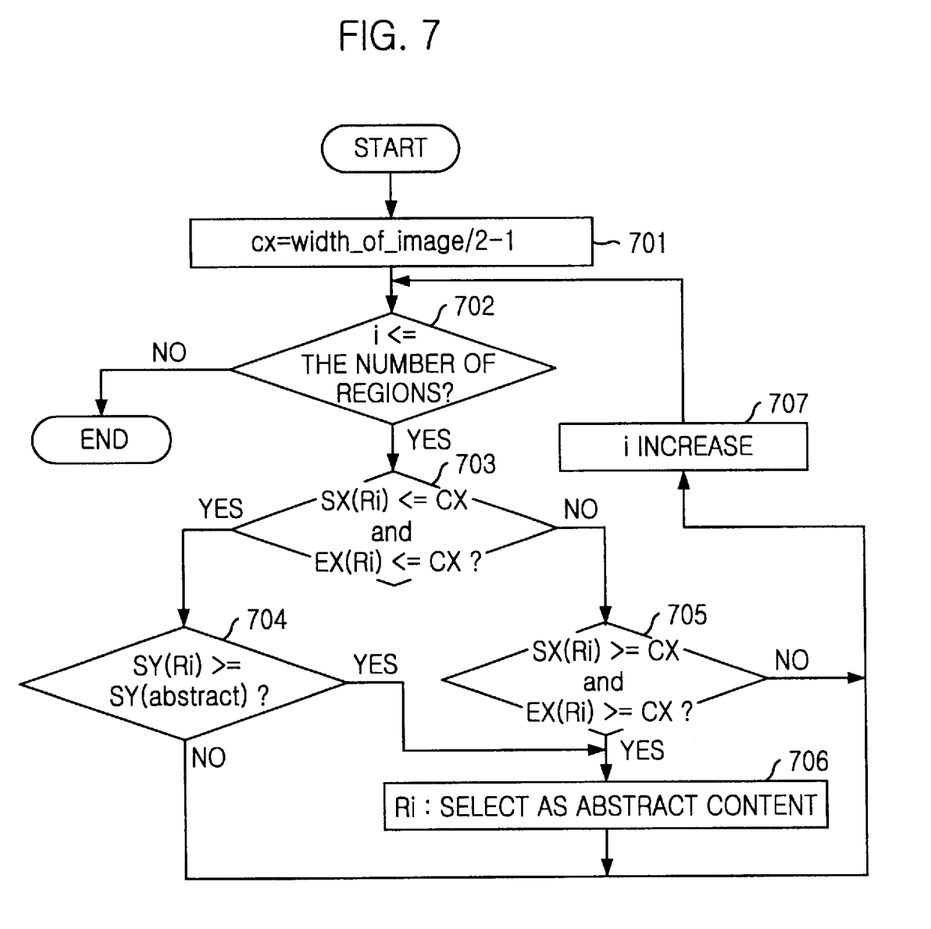
FIG. 7 shows a flowchart of searching an abstract content portion in case that a predetermined word representing 'abstract' exists and a predetermined word representing 'introduction' does not exist and the abstract content portion is positioned at two columns.

As shown in FIG. 7, in steps 701 to 706, in case that the word representing the introduction does not exist and the word representing the abstract exists and the abstract content portion is positioned at two columns in the document image, there is selected a region of which the horizontal direction last coordinate is located at the left of the center of the image document and the vertical direction start coordinate is equal to or larger than that of the region corresponding to the abstract region.

And then, there is selected a region of which the horizontal direction start coordinate is located at the right-hand of the center of the document image. The finally selected region is determined to the abstract content portion.

The above described process for searching the abstract content portion may be programmed as follows:

```
CX = Width_of_Image/2 - 1: horizontal direction center
coordinate of document image
    Repeat loop(repeat until region number, loop counter : I)
    {
        // in case that the region is positioned at left column
        if(SX(Ri) <= CX and EX(Ri) <=CX)
            {
                if(SY(Ri) >= SY(YOYAK or Abstract or Summary))
                    Ri is selected as abstract content region
            }
        // in case that the region is positioned at right column
        else if(SX(Ri) >= CX and EX(Ri) >=CX)
            Ri is selected as abstract content region
```

After detecting the abstract content portion, the title and author is separated.

The separation is classified into three types according to the number of the regions. One of the regions represents volume, number(No.) and the other region represents the title and author.

First, in case that the number of regions containing the title and author is two, the upper region is title and the lower region is the author.

Second, in case that the number of regions containing the title and author is four, a font size of the characters in each of the regions is compared to separate the title and author. For example, first and second, or first and third regions are title and the other regions are author.

Third, in case that the title and author is separated by the structure form, it is determined whether the number of the regions is equal to the number of items of the type definition (TD) and whether the region arrangement structure is identical to the item arrangement structure. Type definition(TD) is a structure form of each of the journals. Table II represents example of TD of Korean published science journals.

TABLE II

| TD | JOURNA | JOURNAL | JOURNAL |
|---|---|---|---|
| Volumn, | O | O | O |
| Page | O | O | O |
| Title - | O | O | O |
| Title - | X | X | X |
| Title- | O | O | O |
| Author- | O | O | X |
| Author- | X | X | O |
| Author- | O | O | O |
| Arrangeme | 1→2→3→ | 1→3→6→5 | 1→2→1→3 |

O: the corresponding item exists
X: the corresponding item does not exist

Hereinafter, the process of separating the title and the author is described in reference with FIGS. 8A and 8B.

Figure 8A:
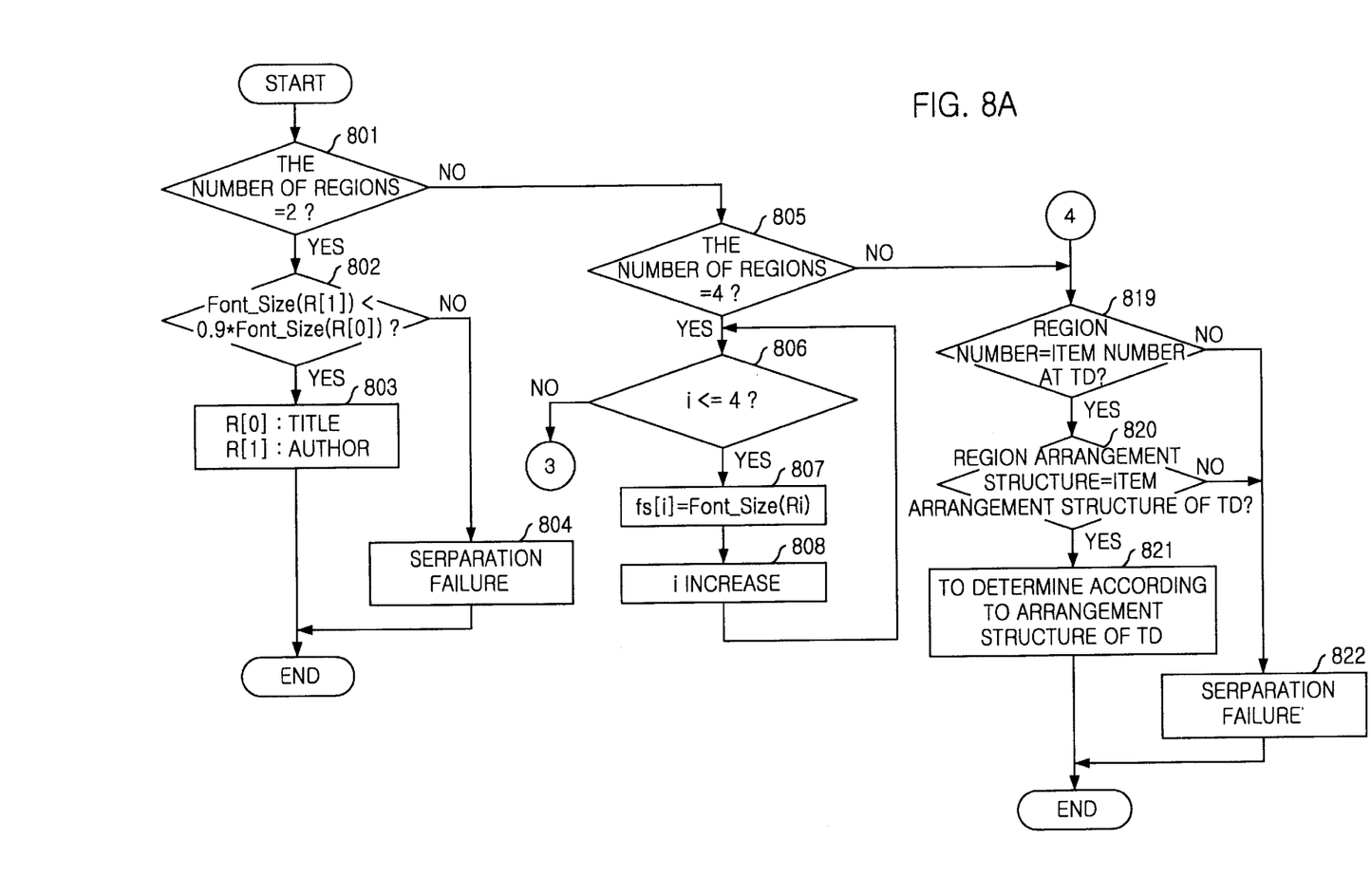
FIGS. 8A and 8B depict flowcharts of separating a title and an author regions in a process of analyzing structure of treatise typed of document image in accordance with present invention.
Figure 8B:
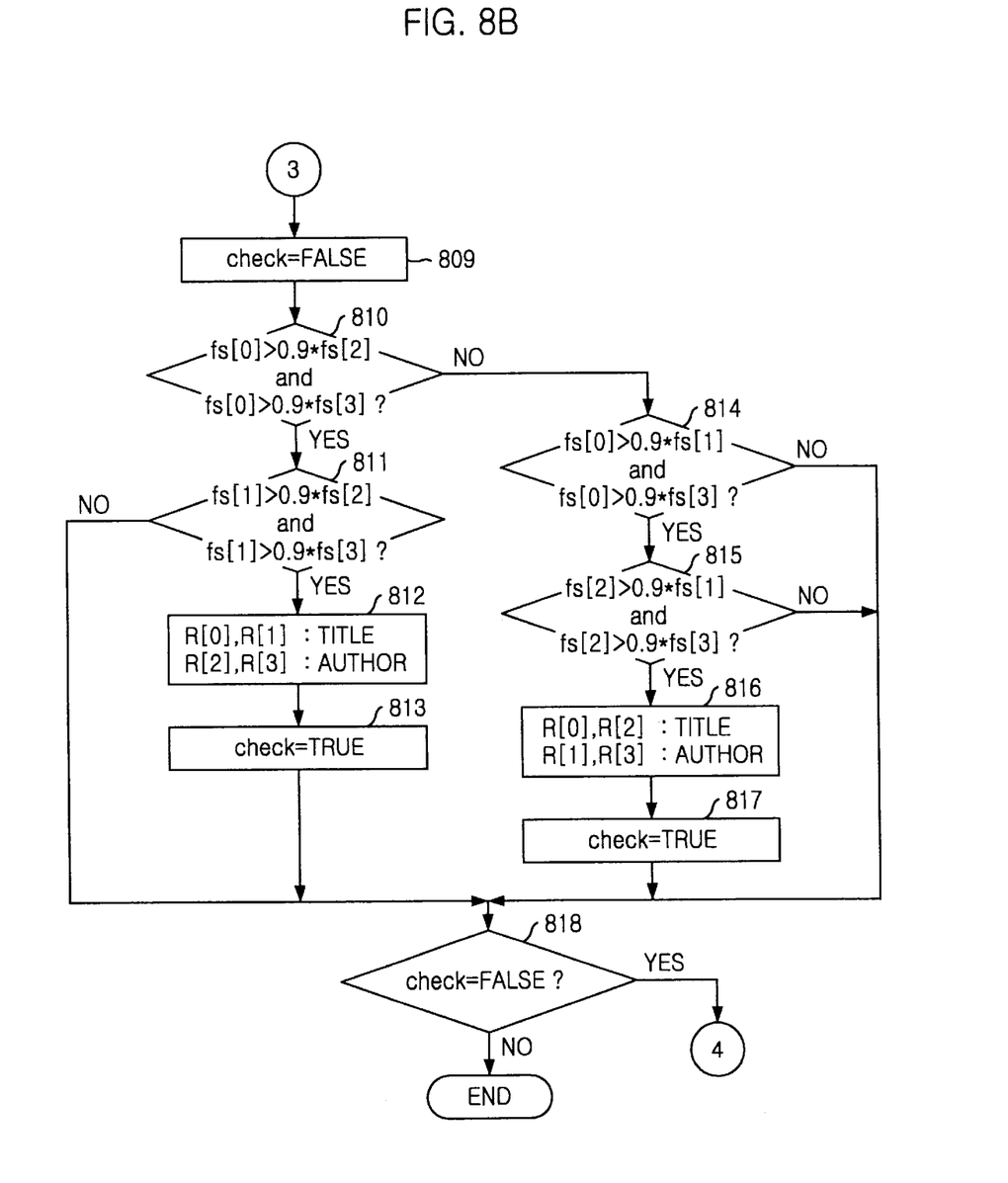

As shown in FIGS. 8A and 8B, in steps 801 to 803, in case that the number of regions containing the title and author is two and the size of the characters of a second region less than a predetermined value(i.e., 0.9), the first region is set to the title and the second region is set to the author.

And then, in steps 805 to 812, in case that the number of regions containing the title and author is four and the sizes of the characters of a first and a second regions is larger than a predetermined time(i.e., 0.9) of the size of the other regions, the first and second regions are set to the title and the third and fourth regions are set to the author.

Thereafter, in steps 814 to 816, in case that the number of regions containing the title and author is four and the sizes of the characters of a first and a third regions are larger than a predetermined time(i.e., 0.9) of the size of the other regions, the first and third regions are set to the title and the second and fourth regions are set to the author.

In steps 818 to 821, in case that the number of regions containing the title and author is not two or four, the title and the author is separated by determining whether the number of the regions is equal to the number of items of the type definition and whether the region arrangement structure is identical to the item arrangement structure.

The above described process for searching the abstract content portion may be programmed as follows:

```
        If(region number = 2)
        {
            if(Font Size(R[1] < 0.9*Font_Size(r[0]))
            {
                R[0]: title
                R[1]: author
            else if(region number = 4)
                repeat number(repeat until region nunber,
                loop counter : I)
                {
                    fs[I] = Font_Size(Ri)//to determine a font
size
                                of each of the regions
                }
            check = FALSE// flag representing that division is succeed
or not
                if(fs[0] > 0.9*fs[2] and fs[0] > 0.9*fs[3])
                {if(fs[1] > 0.9*fs[2] and fs[1] > 0.9*fs[3]
                {
                    R[0],R[1]:title
                    R[2],R[3]:author
                Check = True
                else if (fs[0] > 0.9*fs[1] and fs[0] > 0.9*fs[3])
                {
                    if(fs[2] > 0.9*fs[1] and fs[2] > 0.9*fs[3]
                    {
                        R[0],R[2]:title
                        R[1],R[3]:author
                    Check = True
                    if(check ==FALSE or region number > 4)//in case of
separating by TD
                    {
                        if(region number = item number of TD
                        if(region arrangement structure
                            = item arrangement structure by TD)
                            to determine according to the arrangement
                            structure of the corresponding TD
                    }
```

R[I]:ith region

Figure 9:
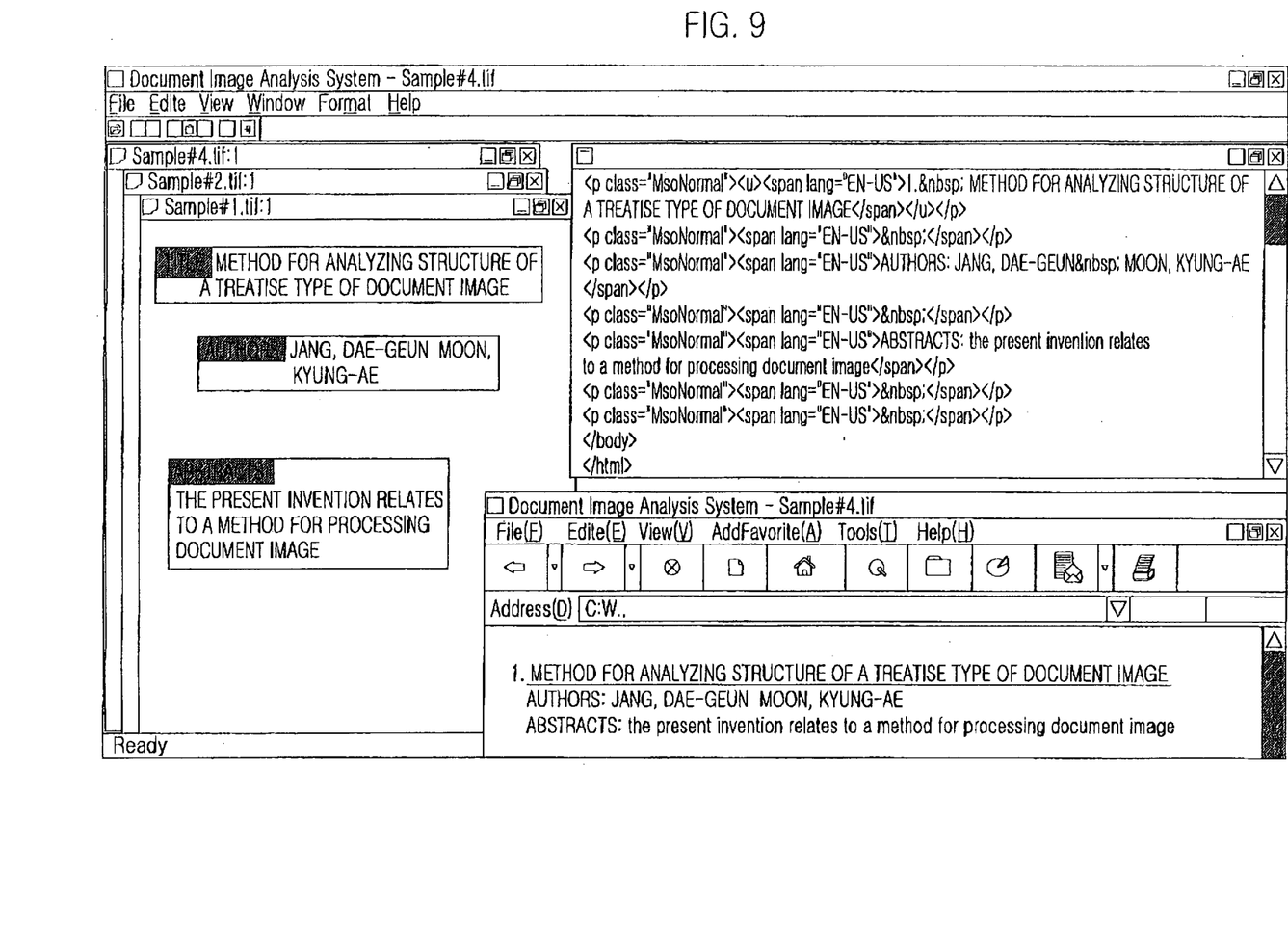
FIG. 9 is an exemplary result screen after analyzing structure of treatise typed of document image in accordance with the present invention.

After separating the title and the author, the content contained at each of the regions is recognized by using a common character recognition system. The regions are the title, the author and the abstract regions. Therefore the table of contents is generated as shown in FIG. 9. FIG. 9 show an exemplary result screen after analyzing structure of treatise typed of document image in accordance with the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for analyzing a structure of a document image to make a table of contents having a title, an author and an abstract, comprising the steps of:

dividing the document image into a number of regions and classifying the divided regions into text regions and non-text regions according to attributes of the regions;

selecting candidate regions representing an abstract region and an introduction region, extracting word regions from the candidate regions, and determining an abstract content portion, said candidate regions being selected from the divided regions when a horizontal length of each of the divided regions is smaller than eight times an average horizontal length of the text regions, and said word regions being extracted from the candidate regions based on a determination probability;

separating the title and the author using a basic structure form and a type definition representing an arrangement of journals; and recognizing a content of the title, author and abstract region to generate said table of contents.

2. The method as recited in claim 1, wherein said document image is divided using an expansion and merging technique which utilizes connected components to expand and merge regions, and said attributes are classified by using a block pixel density and an average and a deviation of spaces of regions.

3. The method as recited in claim 1, wherein the step of extracting the word regions includes the steps of:

obtaining a number of characters in each of the candidate regions;

comparing each of the characters in each of the candidate regions to each of characters in each of predetermined words in order to determine how many characters coincide; and calculating a ratio of a denominator which is the larger of the number of characters of each of the candidate regions and the number of characters of each predetermined word, to a numerator which is the number of the coincided characters, and, in case that the calculated ratio is larger than the determination probability, the candidate region is determined to be a word region.

4. The method as recited in claim 3, wherein the step of determining the abstract content portion includes the steps of:
   selecting a region in which a vertical direction start coordinate is equal to or larger than that of a predetermined region corresponding to the abstract region and is smaller than that of a predetermined region corresponding to the introduction region, when two words representing the abstract and the introduction exist and the abstract content portion is made by one column;
   obtaining a minimum value and a maximum value, when a vertical direction last coordinate of the selected region is larger than that of a comparing region, the minimum value being replaced with the vertical direction start coordinate of the selected region and the maximum value being replaced with the vertical direction last coordinate of the comparing region, and when the vertical direction last coordinate of the selected region is less than that of the comparing region, the maximum value being replaced with the vertical direction start coordinate of the selected region and the minimum value being replaced with the vertical direction last coordinate of the comparing region; and
   determining whether the selected region is the abstract region with the abstract content portion or not by using both the maximum and the minimum values.

5. The method as recited in claim 3, wherein the step of determining the abstract content portion includes the steps of:
   selecting a region in which a horizontal direction last coordinate is located left of a center of the document image, when two words representing the abstract and the introduction exist and the abstract content portion is positioned at a left column of two columns in the document image; and
   selecting a region, among the selected regions, in which a vertical direction start coordinate is equal to or larger than that of a predetermined region corresponding to the abstract region and smaller than that of another predetermined region corresponding to the introduction region.

6. The method as recited in claim 3, wherein the step of determining the abstract content portion includes the steps of:
   selecting a region in which a horizontal direction last coordinate is located left of a center of the document image and a vertical direction start coordinate is equal to or larger than that of a predetermined region corresponding to the abstract region, when two words representing the abstract and the introduction exist and the abstract content portion is positioned in both left and right columns in the document image; and
   selecting a region, among the selected regions, in which a horizontal direction start coordinate is located right of the center of the document image and a vertical direction last coordinate is smaller than that of the region corresponding to the introduction.

7. The method as recited in claim 3, wherein the step of determining the abstract content portion includes the steps of:
   selecting a region in which a vertical direction start coordinate is equal to or larger than that of a predetermined region corresponding to the abstract region, when a word representing the abstract exists and a word representing the introduction does not exist and the abstract content portion is made by one column in the document image;
   obtaining a minimum value and a maximum value, when a vertical direction last coordinate of the selected region is larger than that of a comparing region, the minimum value being replaced with the vertical region start coordinate of the selected region and the maximum value being replaced with the vertical direction last coordinate of the comparing region, and when the vertical direction last coordinate of the selected region is less than that of the comparing region, the maximum value being replaced with the vertical direction start coordinate of the selected region and the minimum value being replaced with the vertical direction last coordinate of the comparing region; and
   determining whether the selected region is the abstract region with the abstract content portion or not by using both the maximum and the minimum values.

8. The method as recited in claim 3, wherein the step of determining the abstract content portion includes the steps of:
   selecting a region in which a horizontal direction last coordinate is located left of a center of the image document and a vertical direction start coordinate is equal to or larger than that of a region corresponding to the abstract region, when a word representing the introduction does not exist and a word representing the abstract exists and the abstract content portion is positioned at two columns in the document image; and
   selecting a region in which a horizontal direction start coordinate is located right of the center of the document image.

9. The method as recited in claim 1, wherein the title and the author are separated using the number of regions, and, when the number of regions containing the title and author is two, a first region is set to the title and a second region is set to the author, and, when the number of regions containing the title and author is four, a font size is compared to set the first and a second regions to the title and a third region and a fourth region to the author, and, when the title and author are separated by the basic structure form, it is determined whether the number of the regions is equal to a number of items of the type definition and whether a region arrangement structure is identical to an item arrangement structure.

10. The method as recited in claim 9, wherein the step of separating the title and author includes the steps of:
    setting, when the number of the regions containing the title and author is two and the font size of characters of the second region is less than a predetermined value, the first region to the title and the second region to the author;
    setting, when the number of the regions containing the title and author is four and the sizes of the characters of the first and the second regions is larger than a predetermined size of the other regions, the first and the second regions to the title, and the third and the fourth regions to the author;
    setting, when the number of regions containing the title and the author is four and the font sizes of the characters of the first and the third regions are larger than a predetermined size of the other regions, the first and the third regions to the title and the second and the fourth regions to the author; and separating, when the number of regions containing the title and author is not two or four, the title and the author by determining whether the number of the regions is equal to the number of items of the type definition and whether the region arrangement structure is identical to the item arrangement structure.

11. A computer readable media containing a program for analyzing a structure of a document image to make a table of contents having a title, an author and an abstract, the program having functions of:

dividing the document image into a number of regions and classifying the divided regions into text regions and non-text regions according to attributes of the regions;

selecting candidate regions representing an abstract region and an introduction region, and finding word regions from the candidate regions to determine a position of an abstract content portion;

separating the title and the author using a basic form structure and a type definition representing an arrangement of journals, said candidate regions being selected from the divided regions when a horizontal length of each of the divided regions is smaller than eight times an average horizontal length of the text regions, and said word regions being extracted from the candidate regions based on a determination probability; and recognizing a content of the title, author and abstract region to generate said table of contents.

\* \* \* \* \*